US011410066B2

(12) United States Patent
Diehl et al.

(10) Patent No.: US 11,410,066 B2
(45) Date of Patent: Aug. 9, 2022

(54) SEND TIME OPTIMIZATION FOR ELECTRONIC COMMUNICATIONS CAMPAIGN

(71) Applicant: Spithre III Inc, Menlo Park, CA (US)

(72) Inventors: Christopher Paul Diehl, Oakland, CA (US); Louis Alexander Potok, San Francisco, CA (US)

(73) Assignee: SPITHRE III INC, Menlo Park, CA (US)

( * ) Notice: Subject to any disclaimer, the term of this patent is extended or adjusted under 35 U.S.C. 154(b) by 0 days.

(21) Appl. No.: 17/005,141

(22) Filed: Aug. 27, 2020

(65) Prior Publication Data

US 2021/0065034 A1  Mar. 4, 2021

Related U.S. Application Data

(60) Provisional application No. 62/892,404, filed on Aug. 27, 2019.

(51) Int. Cl.
*G06N 7/00* (2006.01)
*H04L 41/0686* (2022.01)
(Continued)

(52) U.S. Cl.
CPC ............. *G06N 7/005* (2013.01); *G06N 20/00* (2019.01); *G06Q 10/107* (2013.01); *H04L 41/0686* (2013.01)

(58) Field of Classification Search
CPC ...... G06N 7/005; G06N 20/00; G06Q 10/107; G06Q 30/0271; H04L 41/0686; H04L 51/34
See application file for complete search history.

(56) References Cited

U.S. PATENT DOCUMENTS 8,924,326 B2    12/2014  Arquette et al.
9,088,533 B1 *   7/2015  Zeng ................... G06N 3/084
(Continued)

OTHER PUBLICATIONS

Kerman, J. "Neutral noninformative and informative conjugate beta and gamma prior distributions." Electronic Journal of Statistics vol. 5, Jan. 2011, pp. 1450-1470.
(Continued)

*Primary Examiner* — Miranda M Huang
*Assistant Examiner* — Yao David Huang
(74) *Attorney, Agent, or Firm* — Perkins Coie LLP

(57) ABSTRACT

Disclosed are systems and methods for determining the best time to send an electronic communication from a sender to a recipient. In one aspect, a method is disclosed that includes selecting a time window from a series of candidate time windows based on a corresponding first value for each candidate time window, wherein each first value is representative of a likelihood of receiving an event notification within a specified first delay after the candidate time window. The method further includes selecting a time period from a plurality of time periods within the selected time window based on a corresponding second value for each time period representative of the likelihood of receiving the event notification within a specified second delay after the time period. The method further includes generating a signal indicative of a time within the selected time period at which an electronic communication should be sent.

29 Claims, 6 Drawing Sheets

(51) Int. Cl.
  *G06N 20/00* (2019.01)
  *G06Q 10/10* (2012.01)

(56) References Cited

U.S. PATENT DOCUMENTS

| | | | |
|---|---|---|---|
| 9,319,367 B2* | 4/2016 | Zeng | G06N 20/00 |
| 9,473,446 B2 | 10/2016 | Vijay et al. | |
| 2002/0143710 A1* | 10/2002 | Liu | H04L 9/083 |
| | | | 705/75 |
| 2008/0141168 A1* | 6/2008 | Ryan | G06F 3/0482 |
| | | | 715/808 |
| 2009/0150489 A1* | 6/2009 | Davis | H04W 4/023 |
| | | | 709/204 |
| 2010/0121624 A1 | 5/2010 | Roy et al. | |
| 2013/0325755 A1* | 12/2013 | Arquette | H04L 51/32 |
| | | | 706/12 |
| 2015/0149232 A1* | 5/2015 | Dietz | G06Q 10/1095 |
| | | | 705/7.19 |
| 2015/0350376 A1 | 12/2015 | Vijay et al. | |
| 2015/0381552 A1* | 12/2015 | Vijay | H04L 43/08 |
| | | | 709/206 |
| 2020/0210867 A1* | 7/2020 | Banis | G06N 5/003 |
| 2020/0311487 A1* | 10/2020 | He | G06F 40/279 |
| 2020/0314042 A1* | 10/2020 | Jacobson | H04L 51/18 |
| 2021/0075875 A1* | 3/2021 | Liu | G06N 3/0454 |

OTHER PUBLICATIONS

Thomas, Shane. International Application No. PCT/US2020/048261, International Search Report and Written Opinion dated Jan. 7, 2021, pp. 1-13.

* cited by examiner

400

410 — Selecting, by a computer system, a time window from a series of candidate time windows based on a corresponding first value for each candidate time window, wherein each first value is representative of a likelihood of receiving an event notification within a specified first delay after the candidate time window 420 — Selecting, by the computer system, a time period from a plurality of time periods within the selected time window based on a corresponding second value for each time period representative of the likelihood of receiving the event notification within a specified second delay after the time period 430 — Generating, by the computer system, a signal indicative of a time within the selected time period at which an electronic communication should be sent

FIG. 4

SEND TIME OPTIMIZATION FOR ELECTRONIC COMMUNICATIONS CAMPAIGN

CROSS-REFERENCE TO RELATED APPLICATION

This patent document claims the benefit of U.S. Provisional Patent Application No. 62/892,404, titled, "Send Time Optimization for Email Campaigns," filed on Aug. 27, 2019. The entire content of the above-mentioned patent application is incorporated by reference as part of the disclosure of this patent document

TECHNICAL FIELD

The disclosed subject matter relates to the delivery of electronic communications such as email and text messages.

BACKGROUND

Electronic communications such as emails and text messages are broadly used throughout society for business use as well as personal use. Messages are usually sent at a time that is convenient for the sender such as just after a message is composed or sent in batches when a full contact list is complete and the message is ready to send. These approaches do not optimize the time at which an electronic communication is sent so that each recipient is more likely to read the communication.

BRIEF DESCRIPTION OF THE DRAWINGS

FIG. 4 depicts an example of a method for selecting a time to send an electronic communication.

DETAILED DESCRIPTION

Headings are used in the following description only to aid understanding without limiting the features described.

Introduced here are systems and methods for determining the best time to send an electronic communication from a sender to a recipient based on the times that previous communications were sent and information about when the recipient attended to the communication. Each communication sent may be referred to as a campaign which may be sent to any number of recipients, and information about when the recipient attends to the communication may be referred to as an open event. A system such as disclosed herein learns send time preferences for individual contacts over the course of multiple campaigns. Using the observed open events, a response model is constructed for each contact that characterizes both the likelihood of observing an open event when sending communications within different send time windows and individual day-hour combinations during the week. A day-hour send time corresponds to a particular day of the week and an hour, or other time period, during each particular day. For example, a day-hour send time can be Mondays at 9:00 A.M. There are 7 days×24 hours=168 day-hour send times in a given week. Other day-hour send times can also be used with more than 168 send times or fewer than 168 send times. Each time window corresponds to multiple day-hour time periods. For example, a send time window can be between 8:00 A.M. and 5:00 P.M. on Fridays.

This technique of response modeling using two levels of time resolution, i.e., day-hour response modeling and time window response modeling, accelerates the rate at which the optimization system discovers reasonable send time solutions in the earliest stages of learning while supporting longer-term identification of day-hour combinations that work best for a contact's schedule. In the following sections, a specific approach for modeling response rates for both of these two levels of resolution is described, the methods for estimating the model parameters, and the overall approach for selecting a send time using the two estimated response models.

Figure 1:
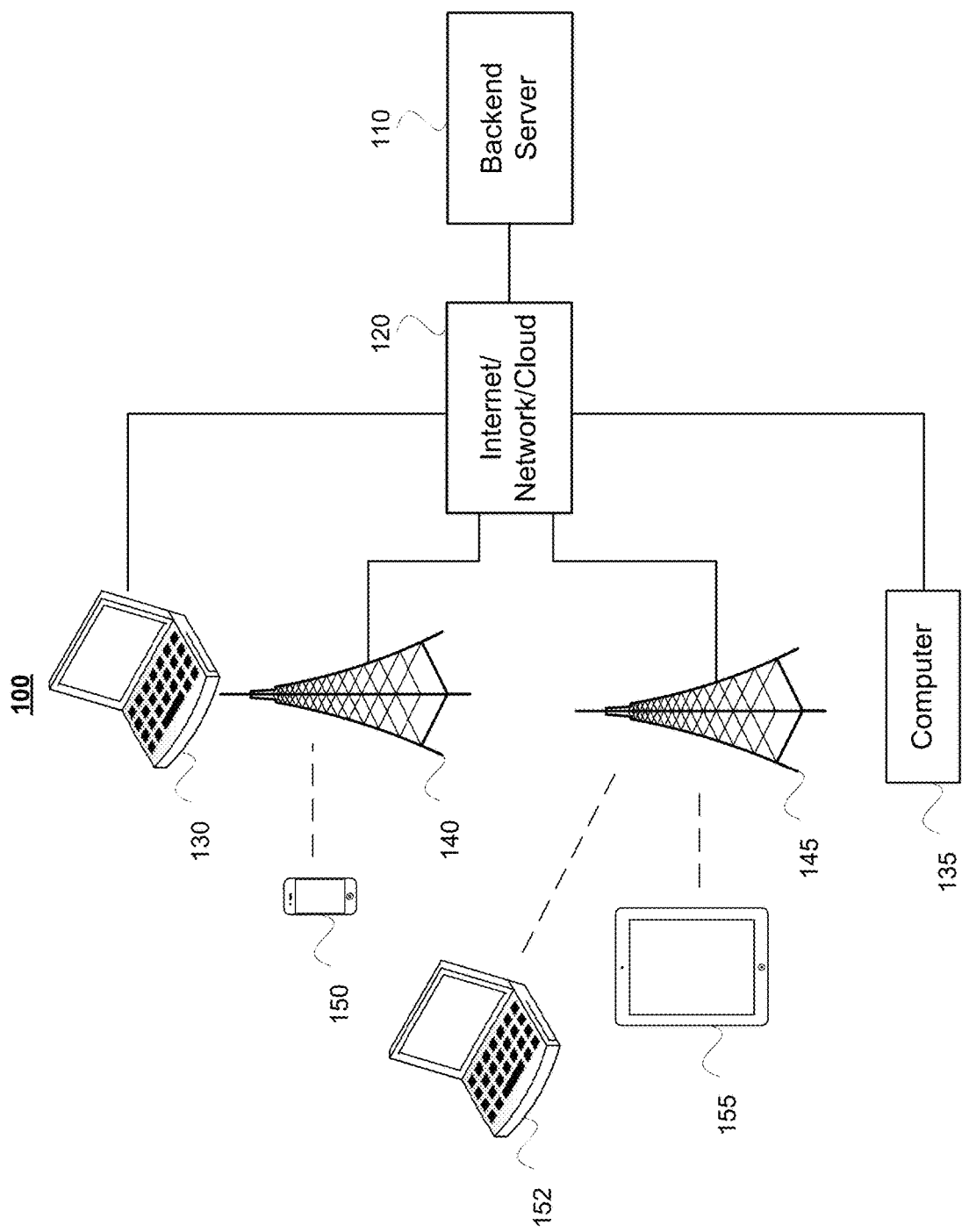
FIG. 1 depicts an example of an electronic communications delivery system.

FIG. 1 depicts an electronic communications delivery system 100 that delivers electronic communications from one node to another node. System 100 includes nodes such as wireless devices including smartphone/cell phone 150, wireless enabled laptop 152, and tablet 155, each served by access points/base stations 140 and 145 and connected through the Internet/network/cloud 120 to backend server 110. Other example nodes include laptop 130, and computer 135 that may have wired connectivity to Internet/network/cloud 120. The communications delivery system can deliver electronic messages from one node to another via the Internet 120 and the backend server 110. Included in backend server 110 is the email send time optimization system and methods for implementing the system. In FIGS. 2-6 and the description below, email may be referred to as one specific example of electronic communications, but the following system and methods also can be applied to other types of electronic communications, including text messages such as SMS or MMS messages, etc.

Figure 2:
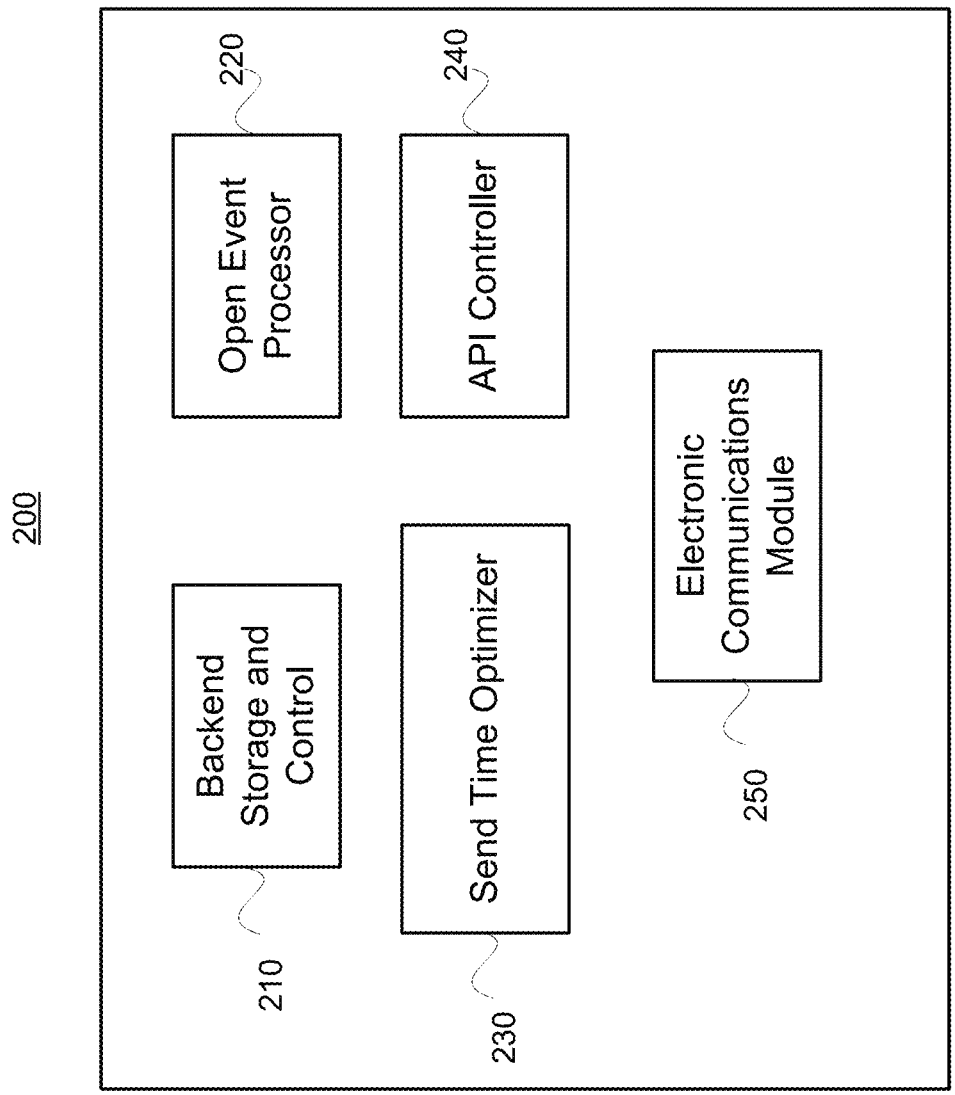
FIG. 2 depicts an example of a backend server.

FIG. 2 depicts a backend server 200 that can be used to implement the techniques introduced here, in accordance with some example embodiments. Backend server 200 can be or represent backend server 110 in FIG. 1. Backend server 200 includes a backend storage and control unit 210, an open event processor 220, a send time optimizer 230, an API controller 240 and an electronic communications module 250. The backend storage and control unit 210 manages email campaigns by determining active campaigns, updating active campaigns, maintaining a database of open events, determining email batches ready to process, requesting optimized send times from send time optimizer 230, and sending emails. The send time optimizer 230 is detailed below, and the features of backend server 200 are further detailed with respect to FIGS. 3A and 3B. Open event processor 220 is responsible for processing open events of messages including a open time for each recipient of an email campaign. Application programming interface (API) controller 240 serves as a control mechanism between the send time optimizer 230 and electronic communications module 250, which sends the emails in the campaign. Send time optimizer 230 optimizes the send time for each recipient in an email campaign based on the open event times and the two-stage model of each recipient. The send time optimizer 230 is described next.

Characterizing a Contact's Response

Contact-level send time optimization is the custom optimization of send times for each contact within a list of multiple contacts. The objective of contact-level send time optimization is to uncover the best day-hour combinations to communicate with a given contact so that the probability is maximized of the contact opening the electronic communication such as email or text. Each time an email is sent to a contact, that action in effect initiates an experiment that could yield additional information about whether a particular day-hour time slot is preferred. In the following description, an experiment is the sending of a particular email to a particular contact during a day-hour time slot and observing the response, which is an email open event. An email open event includes an identification of the email and a time in which it was accessed. An email open event can be a return receipt that the recipient must approve or can be any other mechanism for providing open events, some mechanisms of which the recipient may be unaware. For the purpose of send time optimization, the email open event of interest for a particular email is one that may follow the sending of the particular email which can be characterized as the time delay between the send and open events. If the average delay steadily decreases over time, there is a regularity in the contact's response pattern that the system is incrementally leveraging to deliver emails in a timelier fashion.

Adaptive Online Experimentation

In some example embodiments, the contact-level send time optimization can be understood in terms of a so-called "multi-armed bandit" (MAB) problem, which is a type of reinforcement learning where policies for selecting an action are learned that maximize the average reward for a single time step, as opposed to considering a set of possible futures over a finite or infinite time horizon. The disclosed process for solving the multi-armed bandit problem for email send time optimization selects a day-hour send time, receives feedback about the effectiveness of that choice, updates the underlying model, and repeats the process.

MAB algorithms fall into two broad classes: deterministic and stochastic processes. A deterministic MAB process produces the same prediction when queried repeatedly with a fixed model. A stochastic MAB process, on the other hand, exhibits a degree of randomness in the predictions when a fixed model is queried repeatedly. The send time optimization process described below is based on Thompson sampling which is a stochastic MAB learning process.

Thompson sampling is a Bayesian approach to solving the MAB problem that estimates the posterior distribution of the reward for each potential action conditional on the history of (action, reward) pairs observed up to the present time. When a prediction of the next best action is required, a single sample is drawn from each posterior action reward distribution and the action corresponding to the maximum over the reward samples is returned as the prediction.

Thompson sampling handles an exploration-exploitation tradeoff elegantly due to its stochastic nature. The exploration-exploitation tradeoff refers to the inherent tension between maximizing reward and selecting actions that are poorly understood. In the earliest stages of learning, a greater degree of exploration is used as very little information is available to support predictions. As confidence builds, more actions will be selected that exploit the accumulated evidence to maximize reward.

Modeling the Timely Response Rate

In some example embodiments, the reward, $r(\tau)$, for an email send event that yields a delay, $\tau$, between the email send event and open event. To simplify the definition of $r(\tau)$, a binary reward function is selected that yields a constant reward for open events that arrive within a listening period, $\tau_{lp}$, $$r(\tau) = \begin{cases} 1 & \text{if } \tau \leq \tau_{lp} \\ 0 & \text{otherwise} \end{cases}. \quad \text{Equation 1}$$

When specifying candidate send times, continuous time over the course of a week is discretized into a set of send time periods that cover the week. The response rate modeling performed at the two levels of resolution described above earlier have different candidate send time periods.

In some example embodiments, contact response patterns vary within the context of a week but are assumed to be stable across weeks. This ignores the impact of holidays and other special events, but these can easily be handled by further constraining the set of candidate send time intervals under consideration at prediction time. The disclosed system can automatically respond to similar send time constraints specified by users.

The timely response rate modeling problem is now described. For a general send time period, $$S = \{h : h \in \{0, 1, \ldots, 167\}\}, \quad \text{Equation 2.}$$

spanning a subset of the 168-hour weekly time intervals, the objective is to estimate the timely response rate distribution $p(o_S)$ for period S from observed delays, $$T_S = \{\tau_1, \tau_2, \tau_3, \ldots, \tau_m\}, \quad \text{Equation 3.}$$

for emails sent within period S. Note that for all emails without an observed open, $\tau = \infty$. Additionally, delays are expressed in continuous time.

The first step in the estimation process is to compute the set of rewards, $$R_S = \{r(\tau_1), r(\tau_2), r(\tau_3), \ldots, r(\tau_m)\}, \quad \text{Equation 4.}$$

for all observed delays. This produces a set of binary outcomes indicating whether or not each email sent in the send time period produced a timely response arriving within the listening period.

Due to the binary nature of the response and the assumption that the experiments are independent and identically distributed, the timely response rate $o_S$ is a Beta-distributed random variable where $$o_S \sim (\alpha + \alpha_0, \beta + \beta_0), . \quad \text{Equation 5}$$

$$\alpha = \sum_{m=1}^{m} r(\tau_i), \text{ and.} \quad \text{Equation 6}$$

$$\beta = m - \alpha .. \quad \text{Equation 7}$$

$\alpha_0$ and $\beta_0$ are parameters defining the Beta prior for $o_S$. $\alpha_0 = \beta_0 = \frac{1}{3}$ in order to specify a neutral Beta prior.

Modeling Candidate Send Time Period Response Rates

One of the challenges that marketing professionals continually wrestle with is timezone estimation for contacts in a given segment. In the best of circumstances, additional context is available that allows the system to infer a particular timezone or set of candidate timezones for every contact. Yet often that information is incomplete, leaving one with a set of contacts that could be anywhere. To address this routine scenario, we will assume at first that we have no prior context about the contact's timezone. Later it will be shown how to leverage additional information when it is available.

An assumption of the model is periodicity in patterns of life. Regardless of where someone is located on the planet, particular time intervals in the day where the response rate is highest are expected due to business activity occurring during daylight hours. A first order estimation task is to discern the time interval in the day of ω hours with an offset of γ hours from midnight GMT (or any reference timezone) that yields the maximum response rate when emails are sent anytime within that daily time interval throughout the week.

For clarity, define a single candidate period $S_\gamma(\omega)$ as the subset of hours covering the daily interval of ω hours, offset γ hours from midnight, $$S_\gamma(\omega) = \{(24d + i + \gamma) \bmod 168 \forall d \in \{0, 1, \ldots, 6\}, i \in \{0, \ldots, \omega - 1\}\}, \quad \text{Equation 8.}$$

where $0 < \omega \leq 12$ and $0 \leq \gamma < 24$. The resulting hours in $S_\gamma(\omega)$ will include 7 batches of contiguous hours covering ω hour periods each day of the week. The 168 hours of the week are indexed on the interval $\{0, 1, \ldots, 167\}$.

Estimation of the candidate send time period for the contact amounts to selecting one subset from a defined set of options, $$S = \{S_{\gamma_1}(\omega_1), S_{\gamma_2}(\omega_2), \ldots, S_{\gamma_n}(\omega_n)\} \quad \text{Equation 9.}$$

For simplicity, ω is set to a constant ω* and a candidate send time period is selected from the set, $$S = \{S_\gamma(\omega^*) \forall \gamma \subset \{0, 1, 2, \ldots, 23\}\}. \quad \text{Equation 10.}$$

In some example embodiments, ω*=6 hours and γ offsets are spaced every 3 hours so that the contiguous daily send time intervals overlap by 3 hours.

To simplify notation below, a candidate send time period $S_\gamma(\omega^*)$ is referred to as simply $S_\gamma$ with the understanding that there is an underlying constant period ω* for all the candidate send time periods under consideration.

Modeling the response rate distribution for each candidate send time period $S_\gamma$ now follows the blueprint from the previous section. Observed delays $$T_{S_\gamma}\{\tau_1, \tau_2, \tau_3, \ldots, \tau_m\}, \quad \text{Equation 11.}$$

are aggregated for emails sent within period $S_\gamma$. Then the set of rewards, $$R_{S_\gamma} = \{r(\tau_1), r(\tau_2), r(\tau_3), \ldots, r(\tau_m)\}, \quad \text{Equation 12.}$$

is computed for all observed delays. The timely response rate $o_{S_\gamma}$ is a Beta-distributed random variable with distribution parameters computed as indicated in the previous section.

Modeling Hourly Response Rates

In addition to the above models that characterize response rates for various candidate send time periods, models for the 168 day-hour combinations throughout the week are also generated. Models at this resolution allow the accumulation of information in a form that supports the final step in selecting a particular day-hour send time.

Each candidate period $S_{d,h}$ is defined as, $$S_{d,h} = \{24d + h\}, \quad \text{Equation 13.}$$

and the overall set of candidate periods is $$S = \{S_{d,h} \forall d \in \{0, 1, \ldots, 6\}, h \in \{0, 1, \ldots, 23\}\}. \quad \text{Equation 14.}$$

The observed delays, $$T_{S_{d,h}} = \{\tau_1, \tau_2, \tau_3, \ldots, \tau_m\}, \quad \text{Equation 15.}$$

are aggregated for emails sent within period $S_{d,h}$. Then the set of rewards, $$R_{S_{d,h}} = \{r(\tau_1), r(\tau_2), r(\tau_3), \ldots, r(\tau_m)\}, \quad \text{Equation 16.}$$

is computed for all observed delays. The timely response rate $o_{S_{d,h}}$ is Beta-distributed random variable with distribution parameters computed as indicated above.

Putting the Pieces Together: Prediction and Model Updates

With the response rate distributions specified for both the candidate send time periods and the hours throughout the week, the procedure by which a send time is generated for a given contact can be defined. This is a two-step process by which first a candidate send time period is selected that constrains the hours under consideration for the week. Then a particular day-hour combination is selected from among the hours that fall in the candidate send time period throughout the week.

Each selection process follows the standard Thompson sampling procedure: draw a single sample from each posterior action reward distribution and select the action corresponding to the maximum over the reward samples. The reward associated with all the options under consideration is the response rate.

For the first step, a single sample is drawn from each candidate send time period response rate distribution and select the offset, $$\gamma^* = \arg\max\{\hat{o}_{S_{\gamma_1}}, \hat{o}_{S_{\gamma_2}}, \ldots, \hat{o}_{S_{\gamma_n}}\}, \quad \text{Equation 17}$$

that corresponds to the maximum sampled rate.

For the second step, a single sample is drawn from each day-hour response rate distribution for the hours in the selected candidate send time period and select the day-hour combination, $$(d, h)^* = \arg\max\{\hat{o}_{S_{d,h}} \forall d \in \{0, 1, \ldots, 6\}, h \in \{\gamma^*, \gamma^* + 1, \ldots, \gamma^* + \omega^* - 1\}\}, \quad \text{Equation 18.}$$

that corresponds to the maximum sampled rate.

At the start of the campaign, for all contacts in the campaign population, the corresponding send times for the contacts are computed in this manner leveraging all the available response history. At the conclusion of the campaign, additional responses that occur become part of the overall contact response history that then leads to corresponding updates in the response distribution parameters. Since contacts are assumed to be contacted only once during the course of a single campaign, distribution parameter updates can occur in batch at the conclusion of a particular campaign.

Figure 3A:
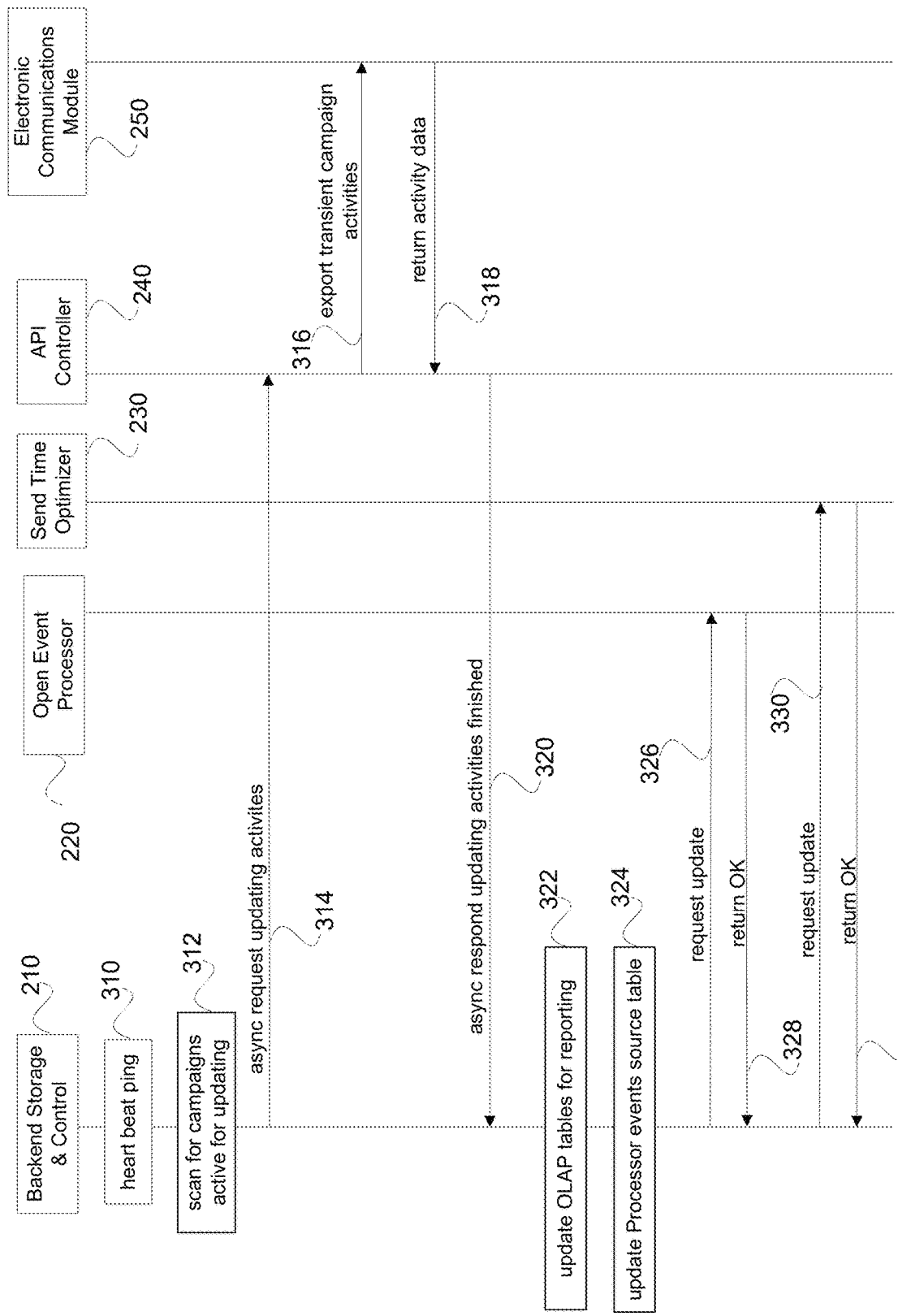
FIG. 3A depicts examples of message exchanges between the hardware elements of FIG. 2.

FIG. 3A depicts message exchanges between the elements of FIG. 2, in accordance with some example embodiments. FIG. 3A shows collecting historical activity for the modeling process. At 310, backend storage and control 210 receives a wake-up signal also referred to as a heart beat ping. At 312, backend storage and control 210 scans for active campaigns. At 314, backend storage and control 210 sends an asynchronous request to API controller 240 updating activities. At 316, API controller 240 exports transient campaign activities to electronic communications module 250. At 318, the electronics communications module 250 returns activity data to API controller 240. At 320. API controller 240 asynchronously responds indicating that the updating activities have finished. At 322, backend storage and control 210 updates online analytical processing (OLAP) tables for reporting. At 324, the open event processor events source table is updated from individual message activities. At 326, the backend storage and control 210 requests an update to the open event processor 220 and at 329, the open event processor responds. At 330, backend storage and control 210 requests an update from the send time optimizer and at 332, the send time optimizer responds.

Figure 3B:
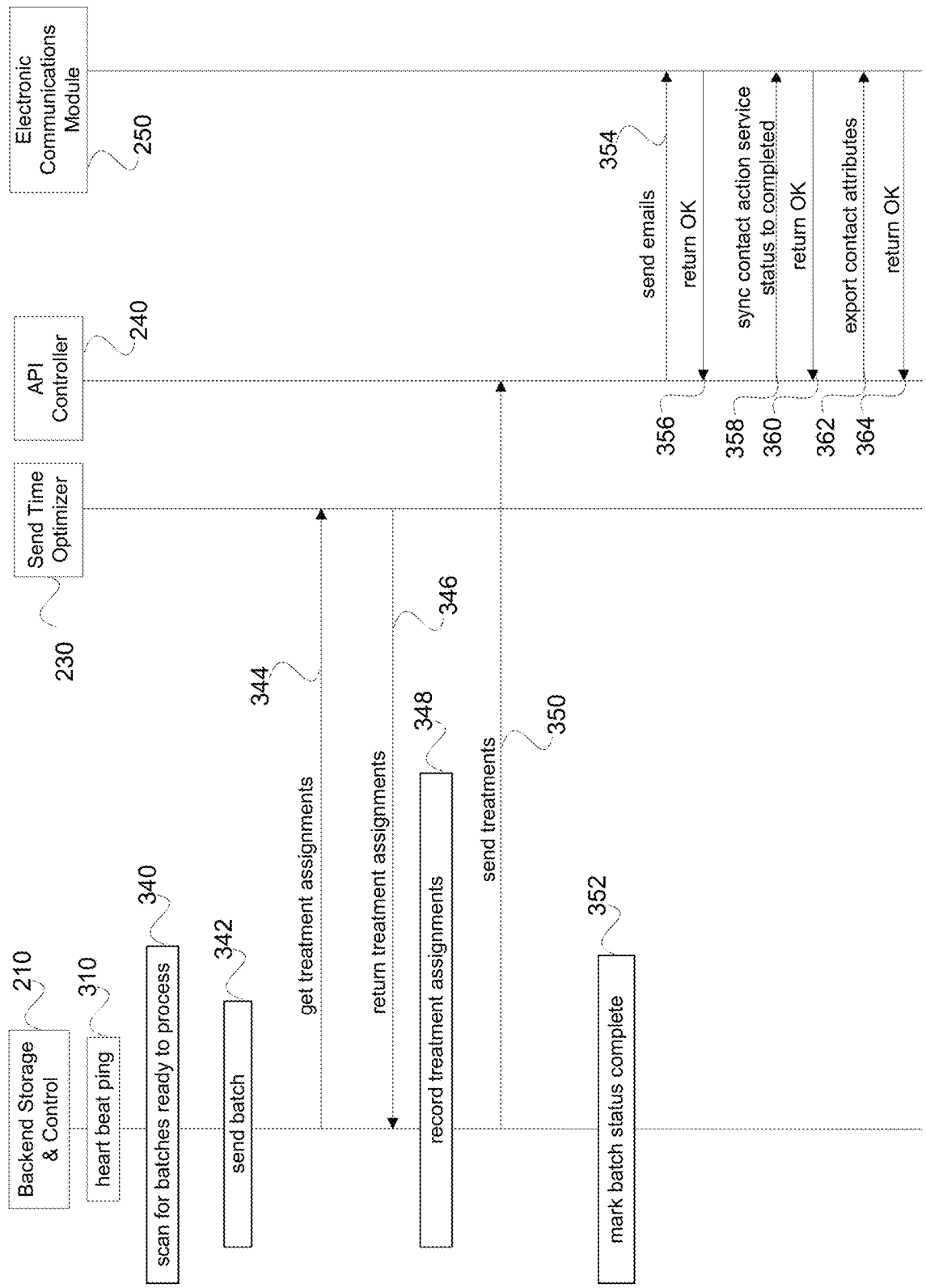
FIG. 3B depicts examples of additional message exchanges between the hardware elements of FIG. 2.

FIG. 3B depicts additional message exchanges between the elements of FIG. 2, in accordance with some example embodiments. FIG. 3B shows constructing batches resulting from the latest modeling and sending the communications instructions with recipients to an external system for sending. A batch is a group of contact recipients, grouped by day/hour. At 310, backend storage and control 210 receives a wake-up signal also referred to as a heartbeat ping. At 340, backend storage and control 210 scans for batches ready to process. At 342, backend storage and control 210 sends a batch. At 344, backend storage and control 210 requests treatment assignments from the send time optimizer 230. In a campaign where the system has all the email recipients, the backend storage and control 210 requests treatment assignments for all of the recipients. In a campaign where contacts flow into the campaign over time, the backend storage and control 210 requests treatment assignments for contacts as they flow in where the system is in a "drip" mode where contacts flow into the system dynamically. At 346, the send time optimizer responds with treatment assignments. At 348, the backend storage and control 210 records the treatment assignments. At 350, the backend storage and control 210 sends the treatments to the API controller 240. At 352, the backend storage and control 210 marks the batch status complete. At 354, the API controller 240 sends the emails to the electronic communications module 250 and at 356, the electronic communications module responds OK. At 358, a request to sync contact action service status is sent to the electronic communications module 250 and at 360, the electronic communications module 250 responds OK. At 362, the backend storage and control 210 exports contact attributes and at 364, the electronic communications module responds OK.

FIG. 4 depicts a method for selecting a time to send an electronic communication, in accordance with some example embodiments. At 410, the method includes selecting, by a computer system, a time window from a series of candidate time windows based on a corresponding first value for each candidate time window, wherein each first value is representative of a likelihood of receiving an event notification within a specified first delay after the candidate time window. At 420, the method includes selecting, by the computer system, a time period from a plurality of time periods within the selected time window based on a corresponding second value for each time period representative of the likelihood of receiving the event notification within a specified second delay after the time period. At 430, the method includes generating, by the computer system, a signal indicative of a time within the selected time period at which an electronic communication should be sent.

Platform Implementation

Figure 5:
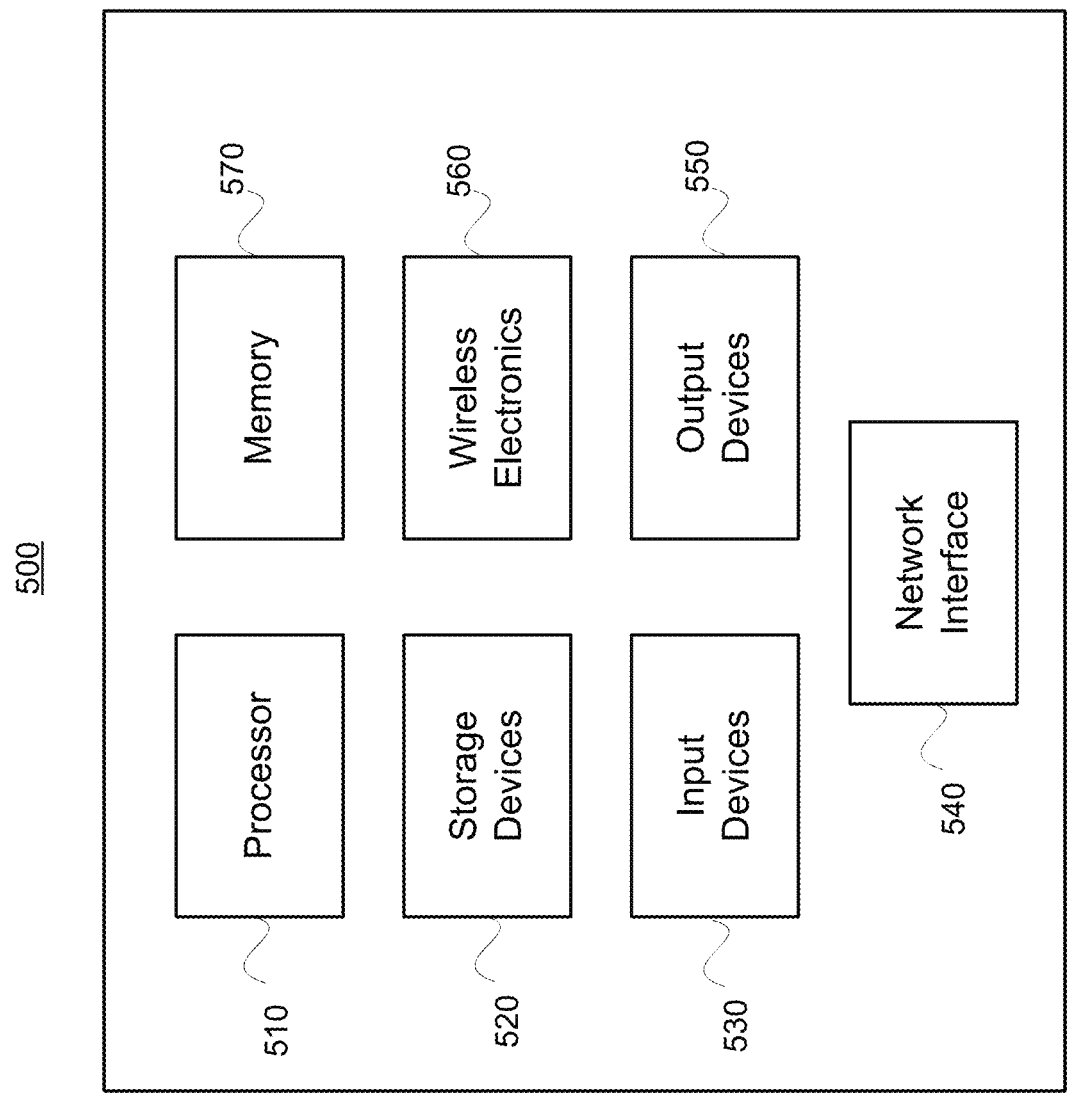
FIG. 5 depicts an example of a computing system.

FIG. 5 depicts a computing system 500 (e.g., node) on which the above-described system and/or methods may be implemented. The computing system 500 may include a desktop computer, a laptop, a tablet, an e-reader, a personal digital assistant, a smartphone, a gaming device, a server, and so on. Computing system 500 may include a central processing unit or processor 510, input devices 530, output devices 550 (e.g., display devices and speakers), storage devices 520 (e.g., memory and disk drives), network interfaces 540, graphics processing units, cellular radio link interfaces, global positioning system devices, and so on. The input devices 530 may include keyboards, pointing devices, touch screens, gesture recognition devices (e.g., for air gestures), head and eye tracking devices, microphones for voice recognition, and so on. The computing systems may access storage devices 520 including computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements the platform. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Many of the processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method comprising:
   selecting, by a server, a time window within a day for delivery of an electronic communication to a recipient from a series of n candidate time windows based on a corresponding first value for each candidate time window forming a plurality of first values, wherein each first value is representative of a first likelihood of receiving an event notification within a first delay after a start of each of the n candidate time windows, wherein each of the series of n candidate time windows is offset in time from a previous candidate time window by a second delay or offset in time from a subsequent candidate time window by the second delay,
   wherein the time window is selected using a first selection process including determining an hours offset from a selected time zone for a first start time of the selected time window, and wherein the determined hours offset corresponds to a first maximum response rate of the n candidate time windows;
   selecting, by the server, a second start time and a day of the week for delivery of the electronic communication to the recipient from a plurality of time periods within the selected time window on each day of the week based on a corresponding second value for each time period forming a plurality of second values, wherein each corresponding second value is representative of a second likelihood of receiving the event notification within a specified third delay after the second start time,
   wherein the plurality of first values are random according to a first continuous probability distribution function and the plurality of second values are random according to a second continuous probability distribution function,
   wherein the second start time is selected using a second selection process including determining a starting hour within the selected time window and the day of the week, and
   wherein the determined starting hour and the day of the week correspond to a second maximum response rate over all the days of the week during each hour within the selected time window;
   generating, by the server, a computer message to cause the electronic communication to be sent to the recipient at the second start time; and
   causing the electronic communication to be transmitted over a network data channel from the server for subsequent delivery to a recipient electronic device.

2. The method of claim 1, wherein the selecting the time window and the selecting the second start time are based on an assumption of periodicity in a pattern of life for the recipient and excludes prior context information about a time-zone for the recipient.

3. The method of claim 2, further comprising:
   receiving an open event notification indicative of an opening day and time of the electronic communication being opened by the recipient, wherein the open event notification comprises a return receipt for an email.

4. The method of claim 3, further comprising:
   updating a first model that determines a first random value for the first value based on the open event notification; and
   updating a second model that determines a second random value for the second value based on the open event notification.

5. The method of claim 1, wherein the electronic communication is a text based electronic communication comprising an email or a text message.

6. The method of claim 1, wherein the first continuous probability distribution function is a Beta distribution and the second continuous probability distribution function is a same Beta distribution as the first continuous probability distribution function or a different Beta distribution from the first continuous probability distribution function.

7. The method of claim 1, wherein the corresponding first value of the selected time window corresponds to a first maximum value of the plurality of first values indicating a first greatest likelihood of generating an open event in the selected time window, and wherein the corresponding second value of the selected time period corresponds to a second maximum value of the plurality of second values indicating a second greatest likelihood of generating an open event in a time period associated with the selected second start time.

8. The method of claim 1, wherein a time period associated with the selected second start time corresponding to a particular day and time has a greatest likelihood of receipt of an open event notification compared to other days and times.

9. The method of claim 1, wherein each candidate time window in the series of time windows is offset by a predetermined amount of time from another candidate time window in the series of time windows, wherein each candidate time window extends for six hours and the predetermined amount of time is three hours.

10. The method of claim 1, wherein each of the plurality of time periods does not overlap any other of the plurality of time periods.

11. The method of claim 1, wherein the selected time window is selected based on in part a time-zone of a recipient or estimated working hours of a recipient.

12. The method of claim 1, wherein the first delay and the second delay are each within a range between two hours to six hours.

13. A non-transitory machine-readable storage medium including instructions, execution of which by at least one processor in a server causes the server to perform operations comprising:

selecting a time window within a day for delivery of an electronic communication to a recipient from a series of n candidate time windows based on a corresponding first value for each candidate time window forming a plurality of first values, wherein each first value is representative of a first likelihood of receiving an event notification within a first delay after a start of each of the candidate time windows, wherein each of the series of candidate time windows is offset in time from a previous candidate time window by a second delay or offset in time from a subsequent candidate time window by the second delay, wherein the time window is selected using a first selection process including determining an hours offset from a selected time zone for a first start time of the selected time window, and wherein the determined hours offset corresponds to a first maximum response rate of the n candidate time windows;

selecting a second start time and a day of the week for delivery of the electronic communication to the recipient from a plurality of time periods within the selected time window on each day of the week based on a corresponding second value for each time period forming a plurality of second values, wherein each corresponding second value is representative of a second likelihood of receiving the event notification within a specified third delay after the time period, wherein the plurality of first values are random according to a first continuous probability distribution function and the plurality of second values are random according to a second continuous probability distribution function, wherein the second start time is selected using a second selection process including determining a starting hour within the time window and the day of the week, and wherein the determined starting hour and the day of the week correspond to a second maximum response rate over all the days of the week during each hour within the time window;

generating a computer message to cause the electronic communication to be sent at the second start time; and causing the electronic communication to be transmitted from the server for subsequent delivery to a recipient electronic device via a network.

14. The non-transitory machine-readable storage medium of claim 13, wherein the executable instructions further cause the at least one processor to perform:

outputting, by the server, an indication of the time within a time period associated with the selected second start time at which the electronic communication will be sent.

15. The non-transitory machine-readable storage medium of claim 14, wherein the executable instructions further cause the at least one processor to perform:

receiving an open event notification indicative of an opening day and time of the electronic communication being opened by the recipient.

16. The non-transitory machine-readable storage medium of claim 14, wherein the executable instructions further cause the at least one processor to perform:

updating a first model that determines a first random value for the first value based on an open event notification; and updating a second model that determines a second random value for the second value based on the open event notification.

17. The non-transitory machine-readable storage medium of claim 14, wherein the electronic communication is a text based electronic communication.

18. The non-transitory machine-readable storage medium of claim 14, wherein the first continuous probability distribution function is a Beta distribution and the second continuous probability distribution function is a same Beta distribution as the first continuous probability distribution function or a different Beta distribution from the first continuous probability distribution function.

19. The non-transitory machine-readable storage medium of claim 14, wherein the corresponding first value of the selected time window corresponds to a first maximum value of the plurality of first values indicating a first greatest likelihood of generating an open event in the selected time window, and wherein the corresponding second value of the selected time period corresponds to a second maximum value of the plurality of second values indicating a second greatest likelihood of generating an open event in the selected time period.

20. The non-transitory machine-readable storage medium of claim 14, wherein each candidate time window in the series of time windows is offset by a predetermined amount of time from another candidate time window in the series of time windows.

21. An apparatus comprising:
at least one processor; and
at least one memory storing instructions that when executed, cause the apparatus to perform operations comprising:
selecting a time window within a day for delivery of an electronic communication to a recipient from a series of n candidate time windows based on a corresponding first value for each candidate time window forming a plurality of first values, wherein each first value is representative of a first likelihood of receiving an event notification within a first delay after a start of each of the candidate time windows, wherein each of the series of candidate time windows is offset in time from a previous candidate time window by a second delay or offset in time from a subsequent candidate time window by the second delay, wherein the time window is selected using a first selection process including determining an hours offset from a selected time zone for a first start time of the selected time window, and wherein the determined hours offset corresponds to a first maximum response rate of the n candidate time windows;

selecting a second start time and a day of the week for delivery of the electronic communication to the recipient from a plurality of time periods within the selected time window on each day of the week based on a corresponding second value for each time period forming a plurality of second values representative of a second likelihood of receiving the event notification within a specified third delay after the second start time, wherein the plurality of first values are random according to a first continuous probability distribution function and the plurality of second values are random according to a second continuous probability distribution function, wherein the second start time is selected using a second selection process including determining a starting hour within the time window and the day of the week, and wherein the determined starting hour and the day of the week correspond to a second maximum response rate over all the days of the week during each hour within the time window;

generating a computer message to cause the electronic communication to be sent at the second start time; and causing the electronic communication to be transmitted from the apparatus for subsequent delivery to a recipient electronic device via a network.

22. The apparatus of claim 21, wherein the operations further include:

outputting an indication of the time within the selected period at which the electronic communication will be sent.

23. The apparatus of claim 21, wherein the first continuous probability distribution function is a Beta distribution and the second continuous probability distribution function is a same Beta distribution as the first continuous probability distribution function or a different Beta distribution from the first continuous probability distribution function.

24. The apparatus of claim 21, wherein the corresponding first value of the selected time window corresponds to a first maximum value of the plurality of first values indicating a first greatest likelihood of generating an open event in the selected time window, and wherein the corresponding second value of the selected time period corresponds to a second maximum value of the plurality of second values indicating a second greatest likelihood of generating an open event in a time period associated with the selected second start time.

25. A method comprising:

acquiring, by a server, data indicative of open events related to electronic communications received by a contact;

constructing, by the server and based on the acquired data, a first response model that represents a likelihood of observing an open event when sending communications to the contact within different send time windows, wherein each of the different send time windows is offset in time from a previous send time window by a second delay, or offset in time from a subsequent candidate time window by the second delay, wherein a time window is selected from the different time windows using a first selection process including determining an hours offset from a selected time zone for a first start time of the selected time window, wherein the determined hours offset corresponds to a first maximum response rate of the different send time windows, and a second response model that represents a likelihood of observing an open event when sending communications to the contact within individual day-hour combinations, each day-hour combination having a corresponding start time, wherein a second start time is selected using a second selection process including determining a starting hour within the time window and a day of the week, wherein the determined starting hour and the day of the week correspond to a maximum response rate over all the days of the week during each hour within a selected send time window, and wherein the first response model has likelihoods that are random according to a first continuous probability distribution function and the second response model has likelihoods that are random according to a second continuous probability distribution function;

determining a preferred time and the day of the week at which to send an electronic communication to the contact, based on the first response model and the second response model; and generating a signal indicative of the preferred time at which to send an electronic communication to the contact.

26. The method of claim 25, further comprising:

causing, by the server, the electronic communication to be sent to the contact at a time determined based on the signal.

27. The method of claim 25, wherein the electronic communication is an email, text message, or a short message service (SMS) text message, and wherein the first response model and the second response model are stochastic models.

28. The method of claim 1, wherein the first selection process comprises an operation that can be expressed as:

$$\gamma^* = \mathrm{argmax}\{\hat{o}_{S_{\gamma 1}}, \hat{o}_{S_{\gamma 1}}, \ldots \hat{o}_{S_{\gamma n}}\},$$

wherein $\gamma^*$ is the hours offset from the selected time zone for the first start time of the selected time window, and $\hat{o}_{S_{\gamma 1}}, \hat{o}_{S_{\gamma 1}}, \ldots, \hat{o}_{S_{\gamma m}}$, are respective response rates for each of the n candidate time windows.

29. The method of claim 1, wherein the second selection process comprises an operation that can be expressed as:

$$(d,h)^* = \mathrm{argmax}\{\hat{o}_{S_{d,h}} \forall d \in \{0,1,\ldots,6\}, h \in \{\gamma^*, \gamma^*+1, \ldots, \gamma^*+\Omega^*-1\}\},$$

wherein (d, h)* represents a candidate start time with duration equal to a third delay with start time hour offset, h, being a member of a set of offsets from $\gamma^*$ to $\gamma^*+\Omega^*-1$ and day of the week, d, identified by numbers 0, 1, . . . 6, for sending the electronic communication, wherein $\hat{o}_{S_{d,h}}$, are response rates for each d and h and wherein $\Omega^*$ is the first delay.

* * * * *